United States Patent [19]

Endres

[11] Patent Number: 6,058,829

[45] Date of Patent: May 9, 2000

[54] FOOD PREPARATION DEVICE

[75] Inventor: W. Eric Endres, Overland Park, Kans.

[73] Assignee: Windmere Corporation, Miami Lakes, Fla.

[21] Appl. No.: 09/213,929

[22] Filed: Dec. 17, 1998

[51] Int. Cl.[7] ............................................. A47J 37/08
[52] U.S. Cl. ..................... 99/329 RT; 99/385; 99/389; 99/357; 83/454; 426/518; 426/520
[58] Field of Search ............................. 99/329 RT, 385, 99/389, 391, 393, 357; 83/454, 762; 269/87.2, 762; 426/518, 520

[56] References Cited

U.S. PATENT DOCUMENTS

| | | | |
|---|---|---|---|
| D. 315,275 | 3/1991 | Aziz et al. | D7/673 |
| D. 316,657 | 5/1991 | Mulherin | D7/673 |
| D. 330,315 | 10/1992 | Shved | D7/673 |
| D. 343,770 | 2/1994 | McFarling et al. | D7/673 |
| D. 354,203 | 1/1995 | Naccarato | D7/673 |
| D. 388,288 | 12/1997 | Frye, Jr. et al. | D7/673 |
| D. 393,575 | 4/1998 | Davidson | D7/673 |
| 3,530,279 | 9/1970 | Ottinger | 99/389 X |
| 3,692,975 | 9/1972 | Markus et al. | 219/202 |
| 4,550,636 | 11/1985 | Josselson et al. | 83/743 |
| 4,590,849 | 5/1986 | Uemura et al. | 99/331 |
| 4,807,862 | 2/1989 | Popeil et al. | 269/87.2 |
| 5,431,078 | 7/1995 | Ricard et al. | 83/870 |
| 5,481,953 | 1/1996 | McLeod | 83/762 |
| 5,522,306 | 6/1996 | DeMars | 99/329 RT |
| 5,611,266 | 3/1997 | Kensrue | 99/537 |
| 5,673,608 | 10/1997 | DeMars | 99/385 X |
| 5,690,013 | 11/1997 | Kanarek et al. | 99/391 X |

*Primary Examiner*—Reginald L. Alexander
*Attorney, Agent, or Firm*—Barry E. Deutsch

[57] ABSTRACT

A food preparation device is provided with a toaster portion and an attached slicing mechanism. The device may be used to prepare toasted bagels and other food products. The toaster portion and the slicing mechanism are arranged to provide a compact construction. The slicing mechanism may be provided with slot-shaped guides for guiding a knife. A press plate may be used to hold the food product in a desired position for cutting. In addition, a device may be provided for removing the food product after it has been sliced.

16 Claims, 6 Drawing Sheets

FOOD PREPARATION DEVICE

BACKGROUND OF THE INVENTION

1. Field of the Invention

The present invention relates generally to systems for cutting, slicing, toasting and/or heating food products. According to one aspect of the invention, a device is provided for slicing bagels and/or other food products. According to another aspect of the invention, the device is arranged for toasting sliced bagels, bread slices, pastries and the like. The present invention also relates to a method of handling sliced food products.

2. Description of the Related Art

U.S. Pat. No. 5,522,306 (DeMars) refers to a combined toaster and cutter product. The toaster portion of the DeMars product has a single opening for receiving two bagel halves at the same time. After toasting, the bagel halves fall onto a hinged work surface. The DeMars product has a number of disadvantages. Among other things, it does not make efficient use of counter space. Since the bagel halves are toasted in a single opening, and not side-by-side, the toaster portion is longer than would otherwise be required. In addition, the hinged work surface requires open space in front of the toaster portion. Moreover, it would be difficult to grasp the DeMars product by hand, either to hold it in place or to move it to another location. There is no handle in the vicinity of the cutter portion, and the toaster portion would be hot and electrically active in use. The cutter portion of the DeMars product is a complicated construction with numerous parts. Moreover, the product has no convenient means for removing food slices from the cutter portion.

Other toasting devices and cutting devices are described in U.S. Pat. Nos. 5,673,608 (DeMars), 5,431,078 (Ricard et al.), 4,807,862 (Popeil et al.), Des. 354,203 (Naccarato), Des. 343,770 (McFarling et al.), Des. 330,315 (Shved), Des. 316,657 (Mulherin), and Des. 315,275 (Aziz et al.).

SUMMARY OF THE INVENTION

The disadvantages of the prior art are overcome to a great extent by the present invention. In one aspect of the invention, a food preparation device is provided with a toasting portion and a food slicing portion. The toasting portion has a plurality of elongated toast-receiving openings. The openings may be parallel to each other. The slicing portion has an elongated food-receiving opening that is substantially perpendicular to the toast-receiving openings. The food preparation device has a compact construction that is convenient to use. The device makes good use of available counter space, and it can be conveniently held in place by hand during use. The device may be used to prepare a variety of food products, including toasted bread slices, pastries and bagels.

In a preferred embodiment of the invention, the slicing portion has opposed slots for guiding a knife during a cutting procedure. The knife may be, for example, a long, serrated knife suitable for cutting bagels and other dense bakery products. The present invention should not be limited, however, to the preferred embodiments described herein. A wide variety of cutting tools and food handling devices and utensils may be used with the present invention.

According to another aspect of the invention, the slicing portion has a handle for holding the device immobile on the counter or table during the cutting procedure. The handle may also be used to move the product to another location. The handle may be located at one end of the device. The handle may be grasped by the hand that is not holding the knife. Both hands may be kept safely away from the hot, electrically active toasting portion.

According to another aspect of the invention, the slicing portion has a press plate for securing a bagel (or other food product) during the cutting procedure. The press plate may be formed of a plastic sheet with an integral spring hinge. If desired, the press plate may be located directly beneath the handle. With this arrangement, one hand may be used to both grasp the handle (to stabilize the device) and to move the press plate inwardly to hold the food product firmly in the desired position for cutting. The press plate may have a concave portion for receiving the fingertips of the user's hand. The curved portion helps the user find the correct location for pushing on the press plate.

In a preferred embodiment of the invention, the food preparation device also has a device for lifting cut bagel halves (or other food products) from the slicing portion. In a preferred embodiment, the lifting device may be positioned so that vertically upward movement of the handle lifts the bagel out of the slicing portion.

According to another embodiment of the invention, the lifting device may be positioned to cause the bagel to be lifted forwardly toward the user. The present invention should not be limited, however, to the preferred embodiments described and shown herein.

Preferably, the lifting device is arranged to prevent the bagel from pinching against the end wall of the slicing compartment during an upward lifting motion.

The present invention also relates to a method of making toasted bread slices, toasted pastries, toasted bagels and other food products. In a preferred embodiment of the invention, a single compact device may be used to conveniently handle a variety of different food products.

The above and other advantages and features of the present invention will be better understood from the following detailed description of preferred embodiments of the invention which is provided in connection with the accompanying drawings.

DETAILED DESCRIPTION OF PREFERRED EMBODIMENTS

Figure 1:
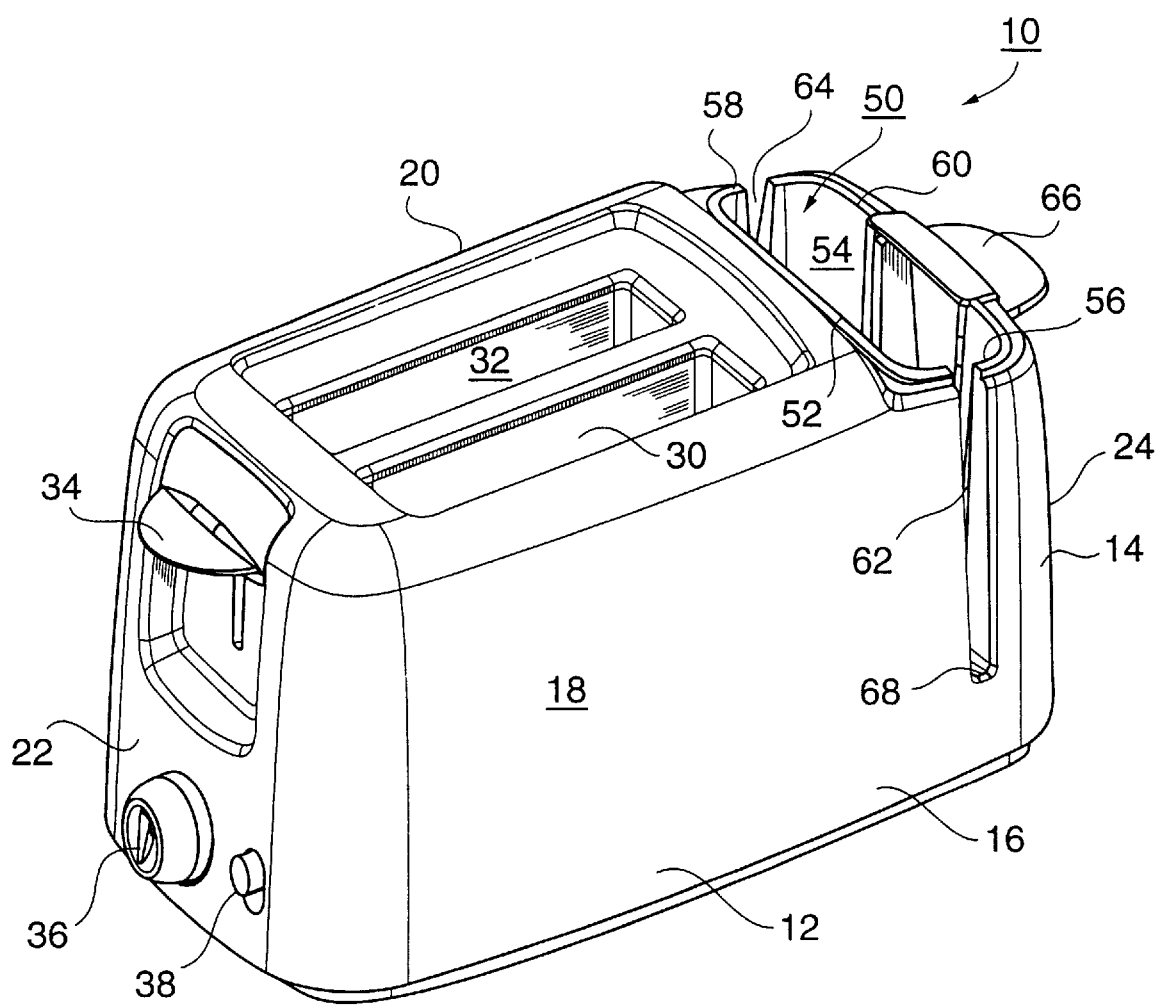
FIG. 1 is a perspective view of a food preparation device constructed in accordance with a preferred embodiment of the invention.
Figure 3:
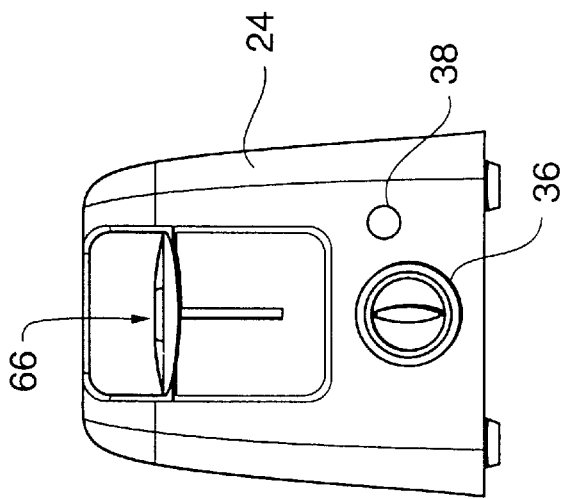
FIG. 3 is a left end view of the food preparation device of FIG. 1.
Figure 2:
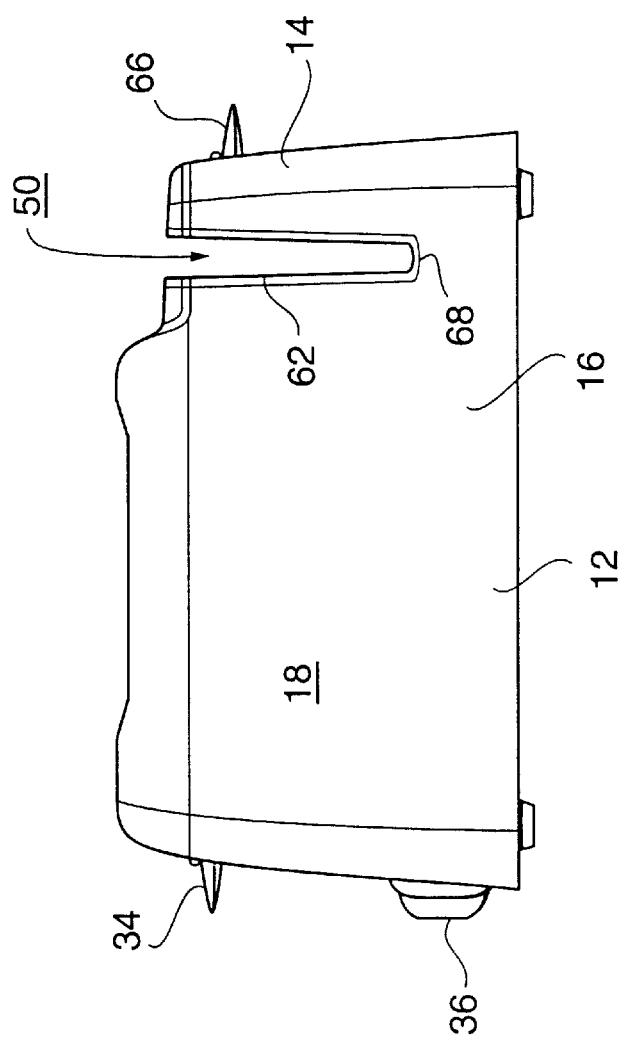
FIG. 2 is a side view of the food preparation device of FIG. 1.

Referring now to the drawings, where like reference numerals designate like elements, there is shown in FIG. 1 a food preparation device 10 constructed in accordance with a preferred embodiment of the invention. The illustrated device 10 has a toasting portion 12 and a slicing portion 14. The slicing portion 14 is integrally connected to the toasting portion 12. The slicing portion 14 and the toasting portion 12 may be located within a common enclosure 16. The illustrated enclosure 16 has elongated side panels 18, 20 and opposed end panels 22, 24.

The toasting portion 12 may be used to toast sliced bagels, sliced bread, muffins, pastries and other food products. The toasting portion 12 has at least two toast-receiving openings 30, 32 with self-centering cages (not illustrated). The openings 30, 32 may be parallel to each other. The toasting portion 12 also has an operating lever 34, an electronic browning control knob 36, and a bagel button 38.

In operation, two halves of a bagel (not shown in FIG. 1) are inserted into the openings 30, 32. Then the lever 34 is depressed, causing the bagel halves to be enclosed by the cages and lowered into the toasting portion 12. A browning cycle begins and the food is toasted. The duration of the browning cycle may be determined by the control knob 36. When the bagel button 38 is in its ON position, only the sides of the bagel halves facing the center of the toasting portion 12 are heated. When the bagel button 38 is in its OFF position, the toasting portion 12 may be used to toast broad slices on both sides.

The present invention should not be limited to the illustrated toasting portion 12. The invention may be practiced with other toasting and/or heating structures.

The slicing portion 14 has a compartment 50 for holding a piece of food, such as a bagel, in an upright position. The compartment 50 has opposed side walls 52, 54, end walls 56, 58, and a generally rectangular opening 60. The opening 60 is elongated and substantially perpendicular to the toast-receiving openings 30, 32. One of the side walls 54 may be formed wholly or partially of a resilient sheet of plastic. The slicing compartment 50 is sized such that a bagel fits loosely but stands generally upright within the compartment 50. The end walls 56, 58 define slot-shaped knife guides 62, 64. A handle 66 is provided on the end panel 24.

Figure 5:
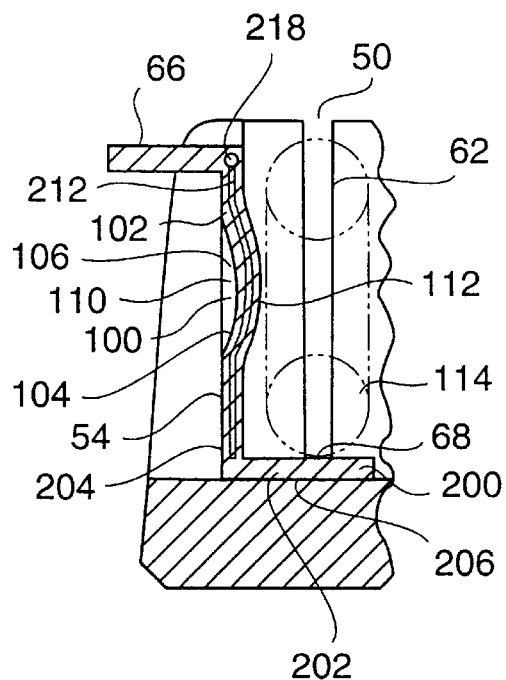
FIG. 5 is a partial cross-sectional view of the food preparation device of FIG. 1, taken along the line 5—5 of FIG. 4.

In operation, the bagel is dropped into the slicing compartment 50 (FIG. 5). The bagel is supported by the side walls 52, 54 in a generally upright position for cutting, and centered with respect to the knife guides 62, 64. Then, a serrated knife (not shown) is placed across the opening 60 and into the knife guides 62, 64. The handle 66 may be grasped by one of the user's hands to stabilize the device 10, if necessary. Then, the knife is moved to and fro through the knife guides 62, 64 in a sawing fashion until the bagel is cut into two halves and the knife reaches the bottoms 68, 70 of the knife guides 62, 64. The knife guides 62, 64 are located to ensure that the bagel is sliced approximately through the center. The sliced bagel may then be retrieved from the slicing portion 14 and placed in the toaster openings 30, 32 for toasting.

Figure 4:
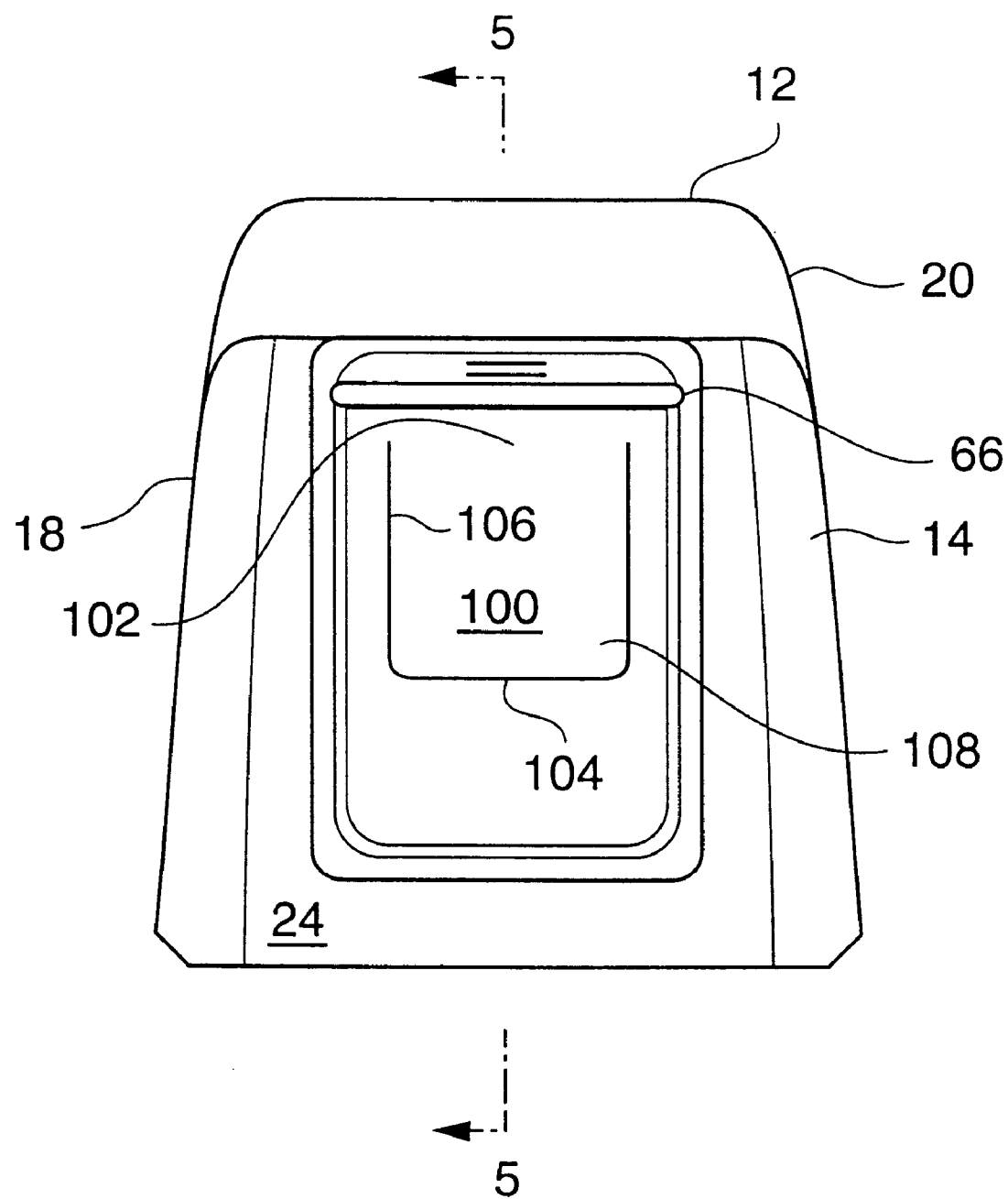
FIG. 4 is a right end view of the food preparation device of FIG. 1.

If desired, a press plate 100 (FIG. 4) may be used to hold the bagel firmly within the slicing compartment 50 during the cutting procedure. As mentioned above, one of the compartment side walls 54 may be formed of a resilient sheet of plastic. The plastic sheet 54 is cut along a U-shaped pattern to form a cantilever-type resilient hinge 102 (FIGS. 4 and 5) on the top of the press plate 100. The hinge 102 is resiliently bendable. The hinged press plate 100 has a bottom edge 104 and opposed side edges 106, 108. Cutting the press plate 100 out of the wall 54 reduces the number of pieces making up the device 10, and it contributes to a rugged, unitary construction that is easy to maintain and keep clean. The side edges 106, 108 are spaced far enough apart to bridge over the open center of a bagel 114 (FIG. 5) in the slicing compartment 50.

The press plate 100 is curved slightly inwardly to form a finger-receiving space 110. In operation, when the user grasps the handle 66, the fingertips of the same hand may be pressed into the finger-receiving space 110 to push the inner surface 112 of the press plate 100 against the bagel 114. The curved space 110 makes it easy for the user to feel the proper location for pushing to prevent the bagel 114 from moving back and forth in the slicing compartment 50. That is, the concave space 110 indicates a pushing location for the press plate 100. When the finger tip pressure is released from the space 110, the resiliency of the hinge 102 causes the press plate 100 to move away from the sliced bagel 114.

If desired, a lifting device 200 (FIG. 5) may be provided for lifting the cut bagel halves out of the slicing compartment 50. The lifting device 200 has a base portion 202, a vertical member portion 204, and a handle 66. In the illustrated embodiment, the base portion 202 is perpendicular to the vertical member portion 204, such that the two portions 202, 204 form an L-shaped device. In the rest position shown in FIG. 5, the base portion 202 rests on the compartment floor 206.

Figure 6:
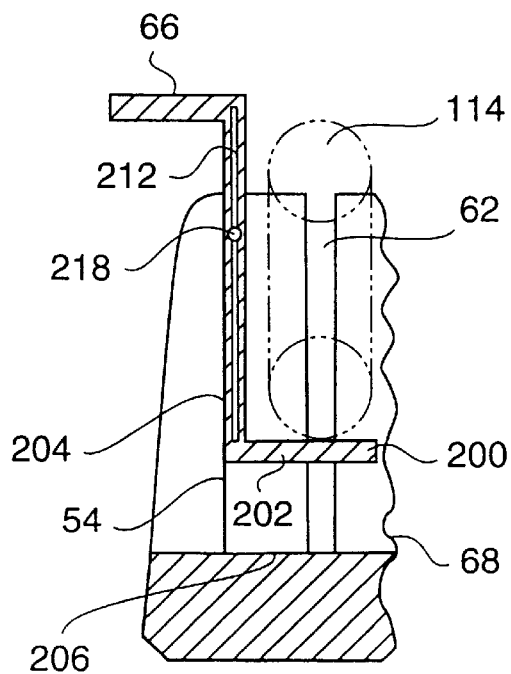
FIG. 6 is another partial cross-sectional view, like FIG. 5, of the food preparation device of FIG. 1, with a handle in a lifted position.

The lifting device 200 is connected to the slicing compartment 50 by a pin-type or hinge guide 218 (FIG. 5) through the slot 212. The slot 212 extends along the vertical portion 204, preferably from the handle 66 to the base portion 202, and has a width substantially equivalent to the width of the guide 218. In operation, after the bagel 114 has been cut into two halves, the handle 66 is lifted upward to the position shown in FIG. 6. Lifting the handle 66 causes the lifting device 200 to slide through the guide 218, which causes the base portion 202 to lift off the floor 206. Once the sliced bagel has been removed, the lifting device 200 may be moved back to its rest position (FIG. 5) so that another bagel can be dropped into the slicing compartment 50. While the second bagel is being cut in the slicing compartment 50, the bagel which has already been sliced may be toasted in the toasting portion 12.

According to another embodiment of the invention, a lifting device 150 (FIG. 7) may be provided for lifting the cut bagel halves toward the user. The lifting device 150 has a base portion 152 and a lever portion 154. In the illustrated embodiment, the base portion 152 is perpendicular to the lever portion 154, such that the two portions 152, 154 form an L-shaped device. In the rest position shown in FIG. 7, the base portion 152 rests on the compartment floor 156. The base portion 152 has a handle 158 extending out of the compartment 50 through one of the knife guides 64.

Figure 9:
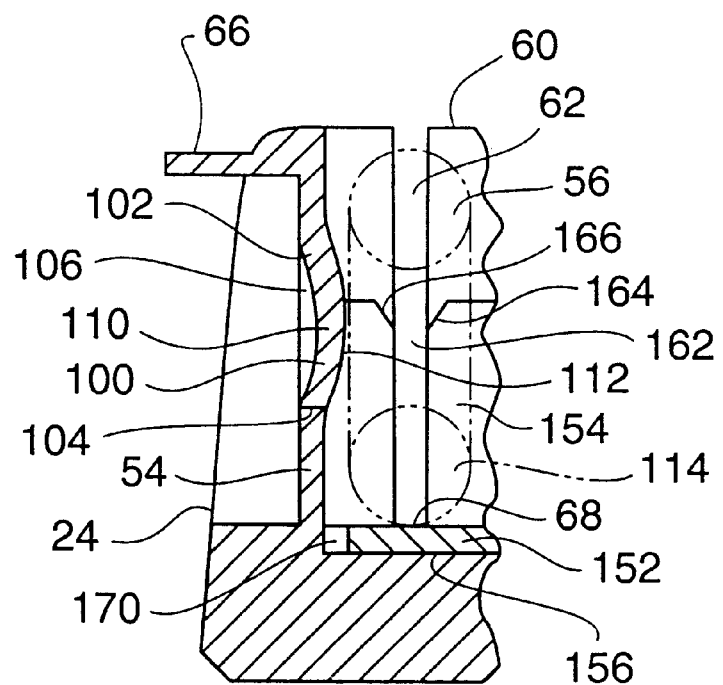
FIG. 9 is a partial cross-sectional view of the food preparation device of FIGS. 7 and 8.

A slot 162 (FIGS. 9 and 10) is formed through the lever portion 154 to accommodate the knife during the cutting procedure. The slot 162 is aligned with the front knife guide 62. If desired, angled shoulders 164, 166 may be formed on the lever portion 154 to help guide the knife into the slot 162.

Figure 7:
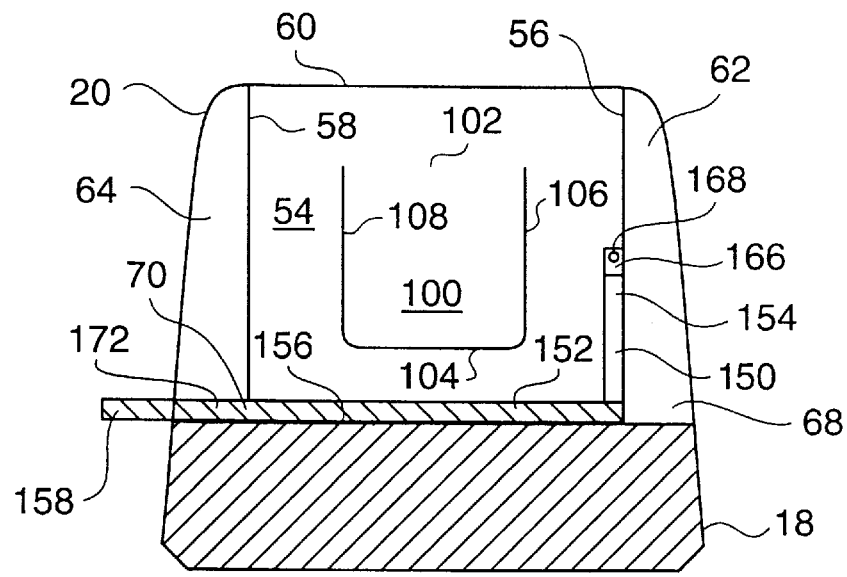
FIG. 7 is a cross-sectional view of another food preparation device constructed in accordance with the invention.
Figure 8:
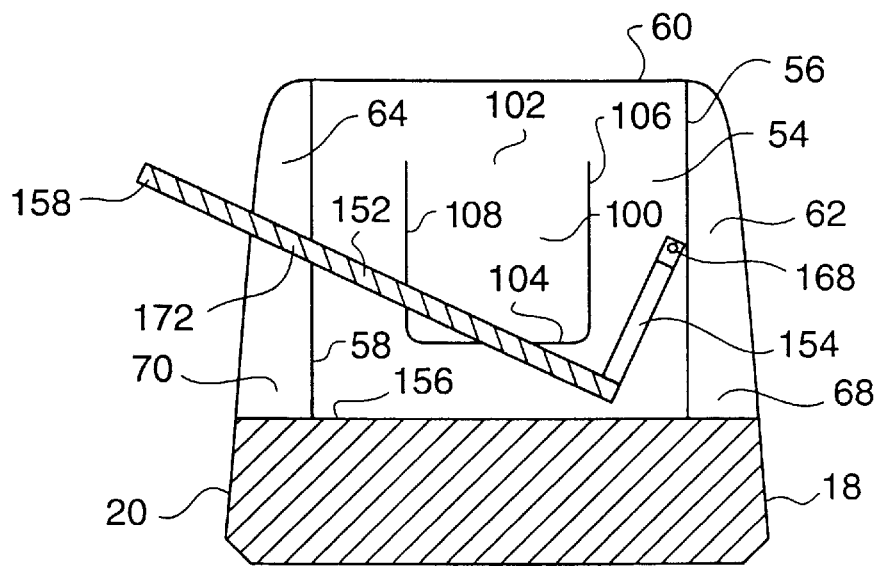
FIG. 8 is another cross-sectional view, like FIG. 7, showing the device in a subsequent stage of operation.

The lever portion 154 is rotatably or pivotably connected to the slicing compartment 50 by a pin-type hinge 168 (FIG. 7). In operation, after the bagel has been cut into two halves, the handle 158 is lifted upward to the position shown in FIG. 8. Lifting the handle 158 causes the lifting device 150 to pivot about the hinge 168, which causes the base portion 152 to lift off the floor 156. At the same time, the lever portion 154 moves away from the end wall 56 so that the bagel portions are not pinched between the base portion 152 and the compartment wall 56. Once the sliced bagel has been removed, the lifting device 150 may be moved back to its rest position (FIG. 7) so that another bagel can be dropped into the slicing compartment 50. While the second bagel is being cut in the slicing compartment 50, the bagel which has already been sliced may be toasted in the toasting portion 12.

Figure 10:
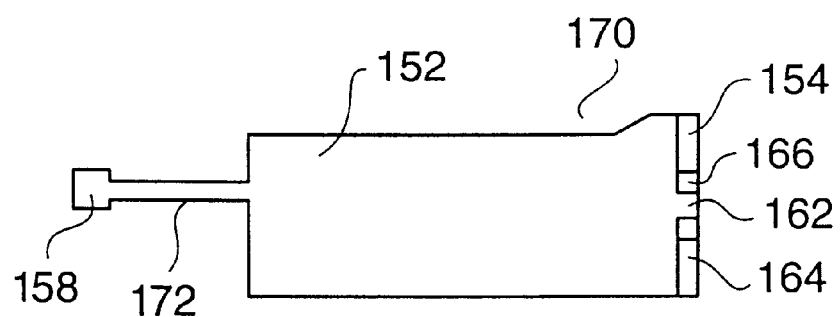
FIG. 10 is a top view of a lifting device for the food preparation device of FIGS. 7–9.

As shown in FIG. 10, the base portion 152 of the lifting device 150 may have a cut-out portion 170 to avoid interference with the press plate 100 during the bagel removing procedure. The base portion 152 also has a narrow neck portion 172 that fits within the rear knife guide 64.

While the invention has been described in detail in connection with preferred embodiments known at the time, it should be understood that the invention is not limited to such disclosed embodiments. Rather, the invention can be modified to incorporate any number of variations, alterations, substitutions or equivalent arrangements not heretofore described, but which are commensurate with the spirit and scope of the invention.

For example, although the slicing portion 14 has been shown integrally attached to the toasting portion 12, the slicing portion may be fabricated as a separate, stand alone unit, if desired.

The invention is not to be seen as limited by the foregoing description, but is only limited by the scope of the appended claims. What is claimed as new and desired to be protected by Letters Patent of the United States is:

1. A food preparation device, comprising:
   a toasting portion having a plurality of elongated toast-receiving openings;
   a slicing portion having an elongated food-receiving opening, said food-receiving opening being substantially perpendicular to said toast-receiving openings; and
   said slicing portion including a lifting device mounted in said food-receiving opening for removing a food product after a cutting procedure.

2. The food preparation device of claim 1, wherein said slicing portion has opposed knife guides for receiving a knife.

3. The food preparation device of claim 1, wherein said slicing portion has a handle for stabilizing said food preparation device during a cutting procedure.

4. The food preparation device of claim 3, wherein said slicing portion includes a press plate for preventing a food product from moving within said slicing portion during the cutting procedure.

5. The food preparation device of claim 1, further comprising an enclosure having side panels and end panels, said toasting portion and said slicing portion being located within said enclosure.

6. A food preparation device, comprising:
   a toasting portion having a plurality of elongated toast-receiving openings;
   a slicing portion having an elongated food-receiving opening, said food-receiving opening being substantially perpendicular to said toast-receiving openings;
   said slicing portion having walls for supporting a food product in said food-receiving opening; and
   a press plate for holding the food product in said food-receiving openings during the cutting procedure, said press plate being formed in one of said walls.

7. A food preparation device in accordance with claim 6 wherein said press plate includes a cantilever-type hinge formed in said one wall, said hinge being resiliently bendable.

8. A food preparation device in accordance with claim 7 wherein said press plate includes a concave portion for indicating a pushing location.

9. A food preparation device in accordance with claim 8 wherein said hinge is formed of resilient plastic material.

10. A food preparation device, comprising:
    a toasting portion having a plurality of elongated toast-receiving openings;
    a slicing portion having an elongated food-receiving opening;
    said slicing portion including a lifting device mounted within said food-receiving opening for removing a food product after a cutting procedure; and
    said slicing portion including walls for supporting the food product in the food receiving opening, and a press plate for holding the food product in said compartment during the cutting procedure, said press plate being formed integral in one of said walls.

11. A food preparation device in accordance with claim 10 wherein said press plate includes a cantilever-hinge formed in said one wall, said hinge being resiliently bendable.

12. A method of preparing food, said method comprising the steps of:
    locating a bagel in a compartment;
    while said bagel is in said compartment, cutting said bagel to form two bagel halves;
    subsequently, toasting said bagel halves in parallel toast-receiving openings; and
    grasping a handle with one hand to stabilize the compartment during said cutting steps, and simultaneously using said hand to move a press plate towards said bagel to secure said bagel in said compartment during said cutting steps.

13. The food preparation method of claim 12, further comprising the step of lifting said bagel halves out of said compartment.

14. The food preparation method of claim 13, wherein said lifting step includes the step of vertically sliding a lifting device within said compartment.

15. The food preparation method of claim 14, wherein said sliding step includes the step of lifting said handle.

16. The food preparation method of claim 15, wherein said lifting step includes the step of pivoting a lifting device within said compartment.

\* \* \* \* \*